Aug. 27, 1963 R. W. REACH, JR 3,102,208

RACE-PREVENTING FLIP-FLOP SWITCHES BY TRAILING EDGE OF CLOCK PULSE APPLIED THROUGH CHARGED SERIES CAPACITOR

Filed Feb. 17, 1960

INVENTOR.
ROY W. REACH, JR.

BY Fred Jacob

ATTORNEY

United States Patent Office 3,102,208

Patented Aug. 27, 1963

3,102,208

RACE-PREVENTING FLIP-FLOP SWITCHES BY TRAILING EDGE OF CLOCK PULSE APPLIED THROUGH CHARGED SERIES CAPACITOR

Roy W. Reach, Jr., Sudbury, Mass., assignor to Minneapolis-Honeywell Regulator Company, Minneapolis, Minn., a corporation of Delaware Filed Feb. 17, 1960, Ser. No. 9,268

12 Claims. (Cl. 307—88.5)

This invention relates in general to a new and improved electrical switching circuit for use in data processing systems, and in particular to a static bistable circuit whose output is controlled by the input signals in synchronism with applied clock or timing pulses.

The use of static bistable circuits and other electrical switching circuits in computer circuitry is well established, particularly as components of larger logical systems. Where transistors are employed in bistable circuits of this type, certain problems arise which are not encountered in more conventional tube circuitry. One of the conditions which frequently attends the use of a transistorized bistable circuit in a larger logical system is referred to as the "race" condition which, when present, results in the premature actuation of any circuitry that is coupled to the bistable circuit.

A typical bistable circuit which forms part of a logical system may consist of a symmetrical flip-flop circuit having a pair of inputs each of which includes a plurality of input terminals. The presence or absence of binary ONE's and ZERO's on these input terminals determines the output of the flip-flop circuit. As a general rule, the action of the flip-flop circuit is synchronized by clock pulses, which may be derived from a pulse distribution amplifier within the logical system of which the flip-flop is a part.

In practice, the clock pulses are generally of finite duration, either as a result of unavoidable pulse clipping or of deliberate clipping in order to transfer more power per pulse and to allow for the transistor frequency characteristics. When it is considered that the time difference between the leading and trailing edges of the clock pulse may be of the order of 0.12–0.15 microsecond at the ten percent pulse amplitude point, it will be appreciated that the resultant operation of the logical system, which operates at frequencies of the order of megacycles, will be ambiguous. Thus, the leading edge of the clock pulse may trigger the flip-flop circuit to an extent where its output signal changes prior to the arrival of the trailing clock pulse edge. As a consequence, the circuits which are actuated by the flip-flop output will be triggered prematurely which, in turn, will actuate other components coupled thereto. The over-all effect of this "race condition" is to limit the frequency at which the logical system can be operated reliably.

Accordingly, it is the primary object of this invention to provide a static bistable circuit which overcomes the foregoing disadvantages and whose operation is synchronously controlled by the trailing edges of the applied clock pulses.

It is another object of this invention to provide a synchronous flip-flop circuit whose output, regardless of the applied input signals, can change only at the time when the applied clock pulse disappears.

It is a further object of this invention to provide a synchronous flip-flop circuit in a logical system which is entirely free of the frequency limitations due to the "race condition."

It is an additional object of this invention to provide a simple and inexpensivee synchronous flip-flop circuit in a logical system whose operation permits close control of the circuit parameters.

The foregoing objects of the invention are carried out in a circuit in which a fixed delay interval is introduced between the appearance of the leading clock pulse edge and the application of the input signal to the transistors of the flip-flop circuit. In brief, this is accomplished by interposing capacitive storage means in the path of the flip-flop circuit input signals, suitably coupled to the input as well as to the flip-flop circuit proper. The applied clock pulses are diode-coupled to the input side of the capacitive storage means, the output side being diode-coupled to a reference point. While the leading clock pulse edge initates the charging of the capacitive storage means, only the trailing edge causes the charge to be transferred to the flip-flop circuit. As a consequence, the output signal of the flip-flop circuit can change only upon the disappearance of the applied clock pulse.

The various novel features which characterize the invention are pointed out with particularly in the claims annexed to and forming a part of this specification. For a better understanding of the invention, its advantages and specific objects thereof, reference should be had to the following detailed description and the accompanying drawings in which:

Figures 1, 2:
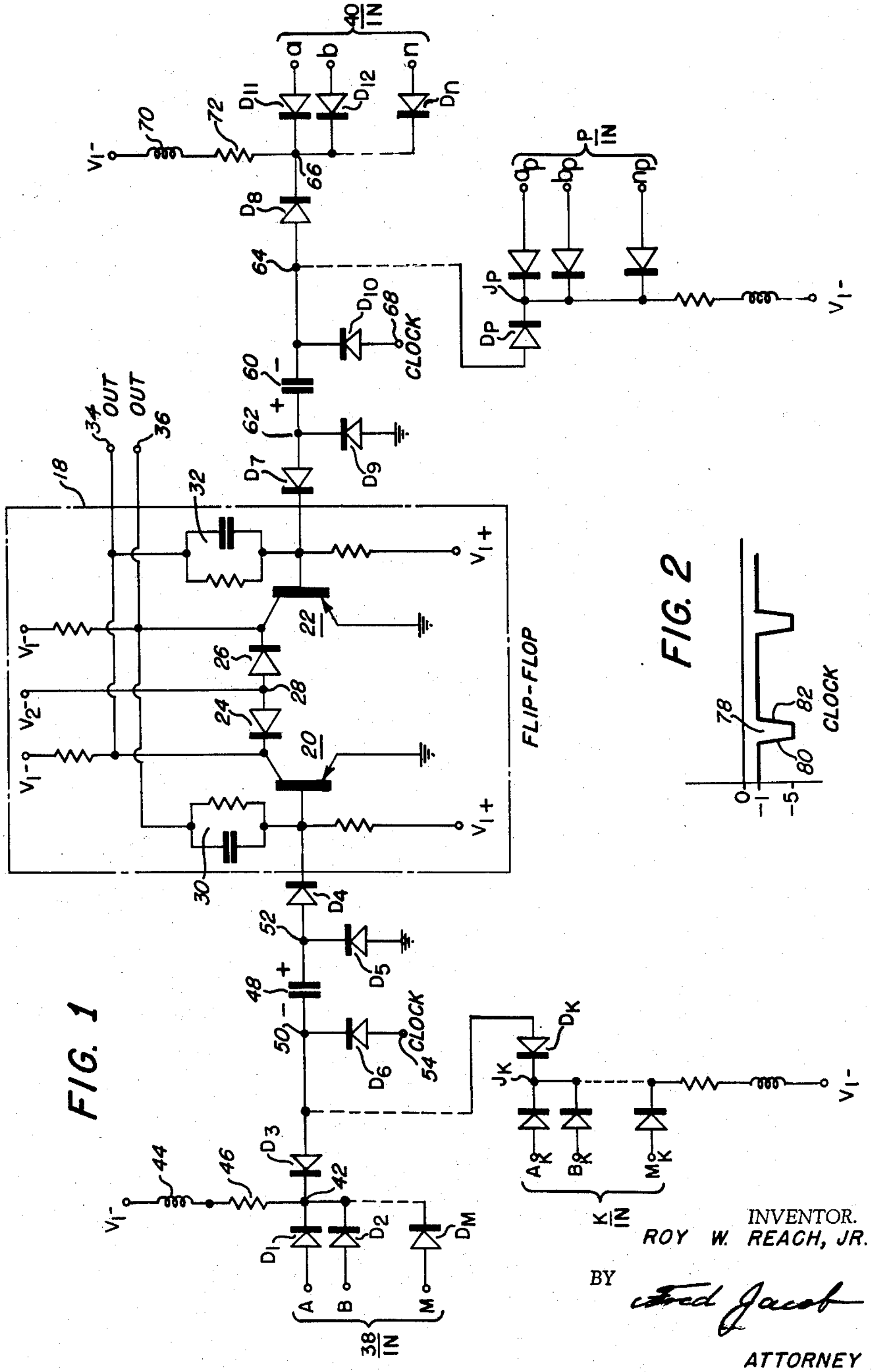
FIGURE 1 illustrates a preferred embodiment of the invention.
FIGURE 2 illustrates the applied clock pulse signals.

With reference now to the drawings, FIGURE 1 shows a symmetrical transistorized flip-flop circuit 18 consisting of a pair of transistors 20 and 22 each having its emitter coupled to a reference point, which is taken to be ground herein. A diode 24 is connected between a junction point 28 and the collector of the transistor 20, and is poled to conduct current to the collector. Similarly, a diode 26 is connected between the junction point 28 and the collector of the transistor 22 and is poled to conduct current to the latter collector. The junction point 28 is connected to a source of negative D.C. potential $V_2-$. A negative D.C. potential $V_1-$, which is more negative than $V_2-$, is resistively coupled to each of the transistor collectors, while a positive D.C. potential $V_1+$ is resistively coupled to the base of each of the transistors. In the illustrated preferred embodiment $V_2-=5$ volts, $V_1+=+15$ volts, and $V_1-=-15$ volts. A parallel RC combination 30 couples the collector of the transistor 22 to the base of the transistor 20, and a similar parallel RC combination 32 couples the collector of the transistor 20 to the base of the transistor 22.

The flip-flop 18 is capable of receiving two input signals each being applied to the base of one of the transistors 20 and 22 respectively. The flip-flop output tsignals appear on the terminals 34 and 36 respectively and are taken from the collectors of the transistors 20 and 22. There is at least one pair of inputs 38 and 40 associated with the flip-flop circuit 18. The input 38 consists of a plurality of input terminals A, B, . . . M, which depend in number on the particular requirements of the logical system of which the flip-flop circuit is a part. These input terminals are coupled to a junction point 42 by the diodes $D_1$, $D_2$, . . . $D_m$, each of which is poled to conduct current to the junction point. The negative D.C. potential $V_1-$ is coupled to the junction point 42 by means of an inductance 44 which is connected in series with a resistance 46. As will be explained in greater detail below, the L/R time constant of these two components is chosen so as to be large compared with the duration of the clock pulse.

A capacitor 48, having first and second terminals 50 and 52 respectively, has its terminal 50 coupled to the junction point 42 by means of a diode $D_3$ which is poled to conduct current to the junction point. The other capacitor terminal 52 is coupled to the base of the transistor 20 by means of a diode $D_4$ which is poled to conduct current to the transistor base. One of the two signals which are directly applied to the flip-flop circuit 18 is thus taken from the output of the diode $D_4$. The capacitor terminal 52 is coupled to ground by means of a diode $D_5$, while the terminal 50 is coupled to a clock pulse terminal 54 by means of a diode $D_6$. The diodes $D_5$ and $D_6$ are both poled to conduct current to their respective capacitor terminals. The terminal 54 is adapted to receive the clock pulses of a pulse distribution amplifier, as will be explained in greater detail hereinbelow. For the purpose of this explanation, the PDA signal may be considered as being applied between the terminal 54 and ground.

Within practical limits, any desired number of inputs may be coupled to the terminal 50 of the capacitor 48. Another input K has been shown in FIGURE 1 of the drawing, for the purpose of illustration. As in the case of the input 38, the input K includes any desired number of input terminals $A_k$, $B_k$, . . . $M_k$, each of which is diode-coupled to a junction point $J_k$. As before, a series-connected resistor-inductance combination couples a negative D.C. voltage to the junction point $J_k$. The latter is further coupled to the capacitor terminal 50 by a diode $D_k$ which is poled to conduct current to the junction point $J_k$.

Except for the total number of inputs on each side of the flip-flop circuit and the number of input terminals in each input, both of which may vary with the particular requirements of the logical system, the two halves of the flip-flop circuit are substantially identical in construction. A capacitor 60, having a pair of terminals 62 and 64, has its terminal 62 coupled to the base of the transistor 22 by means of a diode $D_7$ which is poled to conduct current to the transistor base. The capacitor terminal 64 is coupled to a junction point 66 by means of a diode $D_8$ which is poled to conduct current to the junction point. The capacitor terminal 62 is further coupled to ground by means of a diode $D_9$. A diode $D_{10}$ couples the capacitor terminal 64 to a clock pulse terminal 68 which is adapted to receive clock pulses from the aforementioned pulse distribution amplifier. The diodes $D_9$ and $D_{10}$ are poled to conduct current to their respective capacitor terminals.

The input 40 has a plurality of input terminals *a*, *b*, . . . *n*, depending upon the particular requirements of the logical circuit. The input terminals *a*, *b*, . . . *n* are coupled to the junction point 66 by means of diodes $D_{11}$, $D_{12}$, . . . $D_n$, each of which is poled to conduct current to the junction point 66. The latter is further coupled to a source of negative D.C. voltage $V_1$— by means of an inductance 70 which is connected in series with a resistor 72. The L/R constant of the last two components is chosen so as to be long compared to the duration of a clock pulse. Further inputs may be coupled to the capacitor terminal 64, as illustrated by the input P which includes a plurality of input terminals $a_p$, $b_p$, . . . $n_p$, each being diode-coupled to a junction point $J_p$. The negative D.C. voltage $V_1$— is coupled to the junction point $J_p$ by means of a series-connected resistor inductance combination similar to the RL combination 70—72. The junction point $J_p$ is further coupled to the capacitor terminal 64 by means of a diode $D_p$ which is poled to conduct current to the junction point $J_p$.

FIGURE 2 illustrates the clock pulses 78 which are applied to the terminals 54 and 68 respectively, by the pulse distribution amplifier. In a preferred embodiment of the invention, the output signals of the pulse distribution amplifier have a base of −1 volt, the pulse amplitude being −4 volts. The pulses are seen to be of finite duration and are spaced from each other. As previously explained, a certain amount of pulse clipping inevitably occurs in the equipment used. A predetermined minimal pulse width is required in order for the pulse to transfer the necessary power to carry out its required function, as well as to take into account the frequency characteristics of the transistors 20 and 22. The resulting pulses will approach the idealized shape which is illustrated in FIGURE 2, although in practice the portion between the leading edge 80 and the trailing edge 82 presents a more rounded appearance.

The inventive features of the circuit herein will become apparent from the following description of its operation. For the purpose of this discussion, a zero voltage input signal, i.e., ground potential, will be treated as a binary ZERO, while a negative potential on one of the input terminals, −5 volts in a preferred embodiment, denotes a binary ONE.

The operation of the flip-flop circuit 18 itself is conventional, one of the transistors being saturated, while the other one is cut off. Thus, if the transistor 20 is saturated, the signal appearing on its collector is coupled to the base of the transistor 22 by the RC combination 32, whence it acts to cut off the transistor 22. Similarly, the signal appearing on the collector of the transistor 22 is coupled by means of the RC combination 30 to the base of the transistor 20 to maintain the latter in its saturated state.

Assume that a binary ZERO is applied to one of the input terminals A, B, . . . M of the input 38, as well as to one of the input terminals *a*, *b*, . . . *n* of the input 40. Assume further that similar conditions obtain on all the inputs 38 . . . K and 40 . . . P. Under these conditions and taking into account that $V_1$—=15 volts, the diodes $D_1$, $D_2$, . . . $D_m$ and $D_{11}$, $D_{12}$, . . . $D_n$, the junction points 42 . . . $J_k$ and 66 . . . $J_p$ are clamped to ground regardless of the signals applied to the other input terminals of the corresponding inputs 38 and 40. As long as the signal applied by the pulse distribution amplifier is at −1 volt, the capacitor terminals 50 and 64 will assume a potential between 0 and −1 volt. A more positive potential is precluded by the action of the diodes $D_3$ and $D_8$ respectively, which become conductive under these conditions, while a potential of less than −1 volt on either one of the terminals 50 and 64 is impossible due to the action of the diodes $D_6$ and $D_{10}$ respectively. Accordingly, the capacitors 48 and 60 respectively are able to charge to approximately 1 volt in accordance with the polarities shown.

Upon the arrival of the leading edge 80 of a clock pulse 78, the diodes $D_6$ and $D_{10}$ are cut off. Since the junction points 42 . . . $J_k$ and 66 . . . $J_p$ respectively remain clamped to ground, the diodes $D_3$ . . . $D_k$ and $D_8$ . . . $D_p$ are cut off. The latter action precludes the application of a signal to the condensers 48 and 60 respectively to change the charges thereon. This condition obtains throughout the duration of the pulse 78, the previously-discussed condition reappearing upon the arrival of the trailing pulse edge 82. Accordingly, the signals which are applied to the respective bases of the transistors 20 and 22 remain unchanged and the flip-flop output signals which appear on the terminals 34 and 36 are not affected. Thus, the application of a binary ZERO to at least one input terminal of each of the symmetrical inputs of the flip-flop circuit 18 produces no change of its output signal.

Assume now that binary ONE's are applied to ALL the input terminals of at least one of the inputs 38 . . . K. More specifically, assume that all of the input terminals of at least one of these inputs, e.g., input 38, is at the potential $V_2$— , i.e., at −5 volts. The input signals on the inputs 40 . . . P remain unchanged, i.e., at least one of the input terminals of each of these inputs is at ground and the junction points 66 . . . $J_p$ continue to remain clamped to ground. While the signal which is applied to the terminal 54 by the pulse distribution amplifier is at the −1 volt level, the diodes $D_6$ and $D_3$ conduct, causing the points 42 and the point 50 to be at a potential of —1 volt decreased by the voltage drops in the respective connected diodes. These diodes remain conductive upon the arrival of the leading edge 80 of the clock pulse 78 and the potential on the capacitor terminal 50 changes to −5 volts. This action charges the capacitor 48 to 5 volts decreased by the voltage drops of the diodes in the charging path which is completed by the diode $D_5$. The polarities of the capacitor 48 are as shown in FIGURE 1.

It will be seen that the capacitor charging action alone, which is initiated by the leading edge of the clock pulse, does not affect the state of the flip-flop circuit. When the PDA signal returns to −1 volt upon the arrival of the trailing edge 82 of the clock pulse 78, the resultant positive differential of 4+ volts on the plates of the capacitor 48 transfers a positive charge through the diode $D_4$ to the base of the transistor 20. The capacitor terminal 52 is blocked from ground by the diode $D_5$. This transfer of a positive charge to the transistor 20 cuts off conduction of the latter and starts a regenerative action which saturates the transistor 22 via the RC combination 32 in accordance with the operation of the flip-flop circuit discussed above. Simultaneously, the cut-off condition of the transistor 20 is sustained through the coupling action of the RC combination 30. This action of the flip-flop circuit 18 causes the signals which appear on the output terminals 34 and 36 to reverse.

The resistance-inductance combinations 46—44 and 72—70, etc., which are shown in the drawing, are employed to act as power-saving devices. The RL constants are chosen so as to be long compared to the duration of the clock pulses. Under these conditions, each of the capacitors 48 and 60 sees what is essentially a constant current source. The use of the additional inductance thus effects a considerable power saving, since the applied voltage $V_1$— may be kept relatively low.

It will be understood from the foregoing explanation of the operation of the invention, that the circuit satisfies the requirement of the logical system for a change in the output of the flip-flop only when all the inputs on one side receive binary ONE's. Additionally, a fixed delay is inserted between the initiation of the clock pulse and the transfer of a signal to the base of the transistor which is dependent on the width of the clock pulse. Accordingly, the signals appearing at the flip-flop output terminals 34 and 36 do not change until the applied clock pulse disappears so that ideal flip-flop circuit operation is obtained.

Due to the symmetrical construction of the circuit illustrated in FIGURE 1, the operation is identical if binary ONE's are applied to all of the input terminals of at least one of the inputs 40 . . . P and at least one of the input terminals of the inputs 38 . . . K receives a binary ZERO. In the latter case, the output signals which appear on the terminals 34 and 36 respectively are, of course, reversed. If binary ONE's are applied to all the input terminals of both sides of the circuit, the operation of the flip-flop circuit is indeterminate. As a consequence, this is a condition which must be avoided by suitably designing the logical system of which the flip-flop circuit is a part.

The circuit of FIGURE 1 represents a preferred embodiment of the invention, only, and may be subject to many modifications to satisfy the particular operating requirements of different logical systems. Thus, the invention is not restricted to the precise construction of the transistor flip-flop circuit 18, but is applicable to any electrical switching.

The series-connected RL combinations such as 46—44 and 72—70, may be replaced by different circuitry. As an alternative to the illustrated construction, the inductances 44 and 70 respectively, may be omitted while the applied D.C. voltage $V_1$— is materially increased. With this arrangement, each of the capacitors 48 and 60 will continue to see a substantially constant current source while the over-all power consumption is increased.

It will be understood that the number of input terminals in any given input is independent of the number of input terminals in its symmetrical counterpart. In a larger sense, the number of inputs 38 . . . K need not equal the number of inputs 40 . . . P. These considerations are primarily governed by the requirements of the logical system. Regardless of the total number of input terminals on each side of the flip-flop circuit it is, however, necessary that proper diode poling be observed. By reversing the polarity of the applied D.C. voltages it is possible to reverse the poling of the respective diodes. Under these conditions, however, the flip-flop circuit must be capable of accepting negative pulses.

From the foregoing disclosure of a preferred embodiment of the invention, it will be apparent that numerous modifications, changes, and equivalents will now occur to those skilled in the art, all of which fall within the true spirit and scope contemplated by the invention.

What is claimed is:

1. In combination with a bistable transistor circuit having a pair of symmetrical input circuits each of which comprises a junction point and means for gating a plurality of input signals thereto, means for applying a bias potential to said junction point with respect to a reference point, means for receiving spaced pulses of finite duration, capacitive storage means having first and second terminals, means unilaterally conductive in mutually opposite directions for coupling said first terminal to said junction point and to said pulse receiving means respectively, and means unilaterally conductive in mutually opposite directions for coupling said second terminal to said transistor circuit and to said reference point respectively, said means for coupling said first and second terminals to said transistor circuit and to said junction point respectively being oppositely poled, said storage means being adapted to initiate charging thereof upon the arrival of the leading edges of said pulses and to transfer its charge to said transistor circuit upon the arrival of the trailing pulse edges.

2. In combination with a bistable transistor circuit, a pair of substantially identical input circuits, each of said input circuits comprising means for receiving spaced negative pulses of finite duration, a junction point, means for negatively biasing said junction point with respect to a reference point, a plurality of input terminals, means unilaterally conductive in the direction of said junction point for coupling each of said input terminals thereto, capacitive storage means having first and second terminals, means unilaterally conductive in a direction away from said storage means for coupling said first and second terminals to said junction point and to said bistable transistor circuit respectively, and means unilaterally conductive in a direction toward said storage means for coupling said first and second terminals to said pulse receiving means and to said reference point respectively, said storage means being adapted to initiate charging thereof upon the arrival of the leading edges of said spaced pulses and to transfer its charge to said transistor circuit upon the arrival of the trailing pulse edges.

3. In combination with a bistable transistor circuit, a pair of substantially identical input circuits each including a junction point and a pulse terminal, means for negatively biasing said junction point with respect to a reference point, a plurality of input terminals, means unilaterally conductive in the direction of said junction point for coupling each of said input terminals thereto, capacitive storage means having first and second terminals, means unilaterally conductive in a direction away from said storage means for coupling said first and second terminals to said junction point and to said bistable transistor circuit respectively, and means unilaterally conductive in a direction toward said storage means for coupling said first and second terminals to said pulse terminal and to said reference point, said capacitive storage means being adapted to initiate charging thereof upon the arrival of the leading edges of spaced negative pulses of finite duration applied to said pulse terminal and to transfer its charge upon the arrival of the trailing pulse edges.

4. In an input circuit adapted for use with a bistable transistor circuit, a junction point means for gating a plurality of input signals to said junction point, capacitive storage means having first and second terminals, means unilaterally conductive in a direction away from said storage means for coupling said first and second terminals to said junction point and said bistable transistor circuit respectively, and means unilaterally conductive in a direction toward said storage means for coupling said first and second terminals to said pulse terminal and to said reference point respectively, said capacitive storage means being adapted to initiate charging thereof upon the arrival of the leading edges of spaced negative pulses of finite duration applied to said pulse terminal and to transfer its charge to said transistor circuit upon the arrival of the trailing pulse edges.

5. In an input circuit adapted for use with a bistable transistor circuit, means for receiving spaced negative pulses of finite duration, a junction point, means for negatively biasing said junction point with respect to a reference point, a plurality of input terminals, means unilaterally conductive in the direction of said junction point for coupling each of said input terminals thereto, capacitive storage means having first and second terminals, means unilaterally conductive in a direction away from said storage means for coupling said first and second terminals to said junction point and to said bistable transistor circuit respectively, and means unilaterally conductive in a direction toward said storage means for coupling said first and second terminals to said pulse receiving means and to said reference point respectively, the leading edges of said pulses being adapted to initiate charging of said storage means, the trailing pulse edges being adapted to transfer the stored charge to said transistor circuit.

6. Apparatus for use with a bistable transistor circuit which is responsive to a plurality of input signals comprising first and second terminals, one of said terminals being adapted to receive input signals, means for applying a negative bias to said first terminal with respect to ground, a pulse terminal adapted to receive negative clock pulses of finite duration, a capacitor having a pair of terminals, a first pair of diodes connected between said capacitor terminals and said first and second terminals respectively and poled to conduct current away from said capacitor, and a second pair of diodes coupling said capacitor terminals to said pulse terminal and to ground respectively and poled to conduct current to said capacitor.

7. Apparatus for use with a bistable transistor circuit responsive to a plurality of input signals comprising first and second terminals, means for receiving input signals at said first terminal, means for biasing said first terminal with respect to a reference point, means for receiving clock pulses of finite duration, electrical storage means having a pair of terminals, means unilaterally conductive in a direction away from said storage means for coupling the terminals thereof to said first and second terminals respectively, and means unilaterally conductive in a direction toward said storage means for coupling the terminals thereof to said clock pulse means and to said reference point respectively.

8. A synchronous flip-flop circuit comprising a pair of transistors each adapted to receive an input signal at its base, the emitters of each of said transistors being connected to ground, a pair of parallel RC combinations respectively coupling the collector of each of said transistors to the base of the other transistor, a first pair of oppositely-poled series-connected diodes connected between the collectors of respective ones of said transistors and poled to conduct current in the direction of said collectors, means for applying a first negative bias voltage to the common connection of said first diode pair, means for resistively coupling a negative bias voltage to the collector of each of said transistors, means for resistively coupling a positive bias voltage to the base of each of said transistors, an input circuit coupled to the base of each of said transistors, each of said input circuits including a pulse terminal and at least one junction point, a plurality of input terminals each being diode-coupled to said junction point to conduct current to the latter, means for negatively coupling a second bias to said first junction point, said last recited bias being more negative than said first negative bias, a capacitor having first and second terminals, a second pair of diodes coupling said first and second capacitor terminals to said first junction point and to the corresponding transistor base respectively, said second diode pair being poled to conduct current away from said capacitor terminals, a third pair of diodes coupling said first and second capacitor terminals to said pulse terminal and to ground respectively, said third diode pair being poled to conduct current to said capacitor terminals, and means for applying spaced negative pulses of finite duration to the pulse terminal of said input circuit, the leading edges of said pulses being adapted to initiate capacitor charging, the charge on said capacitor being adapted to be transferred to the transistor coupled thereto upon the arrival of the trailing pulse edges.

9. The apparatus of claim 8 wherein each of said input circuits includes a plurality of negatively biased junction points, a diode coupling each of said junction points to its corresponding first capacitor terminal, said last-recited diode being poled to conduct current away from said capacitor terminal, and a plurality of input terminals associated with each of said junction points and diode-coupled thereto.

10. The apparatus of claim 8 wherein each of said negative bias coupling means associated with said junction point comprises a series-connected resistor-inductance combination, the L/R constant of said combination being long relative to the duration of said pulses.

11. A pulse circuit comprising switching means, a storage circuit including a common junction point, means for applying input pulses to said junction point conditionally adapted to actuate said switching means, and means for applying timing pulses to said junction point, said storage circuit being effective to cause said input pulses to initiate the actuation of said switching means substantially in synchronism with the trailing edges of said timing pulses.

12. A pulse circuit comprising a bistable device, a storage circuit including a common junction point, means for applying input pulses to said junction point for transmission to said bistable device, said input pulses being conditionally adapted to switch the stable state of said bistable device, and means for applying timing pulses to said junction point, each of said timing pulses having a leading and a trailing edge, said storage circuit being effective to cause said input pulses to initiate the actuation of said bistable device substantially in synchronism with the trailing edges of said timing pulses.

References Cited in the file of this patent

UNITED STATES PATENTS

| | | |
|---|---|---|
| 2,536,808 | Higinbotham | Jan. 2, 1951 |
| 2,918,586 | Curtis | Dec. 22, 1959 |
| 2,918,587 | Rector et al. | Dec. 22, 1959 |
| 3,025,412 | Felker | Mar. 13, 1962 |